US011881189B1

(12) United States Patent
Sun et al.

(10) Patent No.: US 11,881,189 B1
(45) Date of Patent: Jan. 23, 2024

(54) DISPLAY DEVICE AND CONTROL METHOD THEREOF

(71) Applicant: SHENZHEN CHINA STAR OPTOELECTRONICS SEMICONDUCTOR DISPLAY TECHNOLOGY CO., LTD., Shenzhen (CN)

(72) Inventors: Yong Sun, Shenzhen (CN); Huangzheng Liu, Shenzhen (CN); Weijie Chen, Shenzhen (CN); Jinmei Zhou, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/888,038

(22) Filed: Aug. 15, 2022

(30) Foreign Application Priority Data

Jul. 22, 2022 (CN) ......................... 202210866752.0

(51) Int. Cl.
*G09G 3/36* (2006.01)

(52) U.S. Cl.
CPC ......... *G09G 3/3688* (2013.01); *G09G 3/3696* (2013.01); *G09G 2300/0828* (2013.01); *G09G 2320/0209* (2013.01)

(58) Field of Classification Search
CPC ............... G09G 3/3688; G09G 3/3696; G09G 2300/0828; G09G 2320/0209
See application file for complete search history.

(56) References Cited

U.S. PATENT DOCUMENTS 8,847,931 B2 * 9/2014 Jeong .................. G09G 3/3648 345/204
9,330,624 B1 * 5/2016 Pei ........................ H03F 3/2173
(Continued)

FOREIGN PATENT DOCUMENTS

CN 101118730 A 2/2008
CN 101236317 A 8/2008
(Continued)

OTHER PUBLICATIONS

Chinese Office Action issued in corresponding Chinese Patent Application No. 202210866752.0 dated May 30, 2023, pp. 1-8, 19pp.

*Primary Examiner* — Michael J Jansen, II
(74) *Attorney, Agent, or Firm* — The Roy Gross Law Firm, LLC; Roy Gross

(57) ABSTRACT

The present invention provides a display device and a control method thereof. The display device includes a display panel and a voltage processing module. The display panel includes a common electrode and a plurality of data lines; wherein the voltage processing module is connected to the common electrode to determine a difference between a common voltage signal in an $n^{th}$ frame and a standard voltage, and is connected to at least one of the common electrode and the plurality of data lines, and controls a voltage of the at least one of the common electrode and the plurality of data lines in an $(n+k)^{th}$ frame, wherein both n and k are positive integers.

14 Claims, 5 Drawing Sheets

(56) References Cited

U.S. PATENT DOCUMENTS

| | | | | |
|---|---|---|---|---|
| 9,449,568 | B2 * | 9/2016 | Hu | G09G 3/3688 |
| 11,328,685 | B2 * | 5/2022 | Yang | G09G 3/3696 |
| 2012/0293466 | A1 * | 11/2012 | Jeong | G09G 3/3648 345/204 |
| 2014/0132580 | A1 * | 5/2014 | Hu | G09G 3/3614 345/96 |
| 2021/0335316 | A1 * | 10/2021 | Yang | G09G 3/3655 |

FOREIGN PATENT DOCUMENTS

| | | | |
|---|---|---|---|
| CN | 101320170 | A | 12/2008 |
| CN | 101329843 | A | 12/2008 |
| CN | 104376829 | A | 2/2015 |
| CN | 105551414 | A | 5/2016 |
| CN | 105702195 | A | 6/2016 |
| CN | 107680546 | A | 2/2018 |
| CN | 109377960 | A | 2/2019 |
| CN | 112885307 | A | 6/2021 |

* cited by examiner

DISPLAY DEVICE AND CONTROL METHOD THEREOF

BACKGROUND

Field of Invention

The present invention relates to a field of display technology, in particular to manufacture of display devices, and specifically to a display device and a control method thereof.

Description of Prior Art

Liquid crystal displays (LCDs) have advantages of a long service life, easiness of colorization, and uneasiness of screen burning.

Wherein a plurality of coupling capacitors will be formed between a plurality of data lines and a common electrode plate in the LCDs. When voltages transmitted in the data lines jump, because a voltage difference between two ends of the capacitor cannot be changed in a short time, a voltage of the common electrode plate also changes instantly, causing horizontal crosstalk, resulting in occurrence of horizontal black lines or white lines in a displayed image, which reduces quality of the displayed image of the LCDs.

Therefore, current LCDs have a phenomenon of horizontal crosstalk of the displayed image caused by a jump of the voltages transmitted in the data lines, which needs to be improved.

SUMMARY

The present invention aims to provide a display device and a control method thereof, so as to solve a technical problem of horizontal crosstalk of a displayed image caused by a jump of voltages transmitted in data lines in LCDs.

The present invention provides a display device, comprising:

a display panel, comprising a common electrode and a plurality of data lines;

a voltage processing module, comprising a first input node and a first output node, wherein the first input node is electrically connected to the common electrode to obtain a common voltage signal of the common electrode in an $n^{th}$ frame, and the first output node is electrically connected to at least one of the common electrode and the plurality of data lines;

wherein the voltage processing module is configured to control a voltage of the at least one of the common electrode and the plurality of data lines in an $(n+k)^{th}$ frame through the first output node according to a difference between the common voltage signal of the $n^{th}$ frame and a standard voltage, and both n and k are positive integers.

In an embodiment, the voltage processing module comprises a voltage comparison module, the voltage comparison module comprises a second input node, a third input node, and a second output node, the second input node is electrically connected to the first input node, the second output node is electrically connected to the first output node, and the third input node is configured to be loaded with a frame synchronization signal;

wherein the voltage comparison module is configured to generate a first target voltage signal according to the difference between the common voltage signal in the $n^{th}$ frame and the standard voltage in response to a synchronization pulse appearing in the frame synchronization signal, and the voltage of the at least one of the common electrode and the plurality of data lines in the $(n+k)^{th}$ frame is related to the first target voltage signal.

In an embodiment, the voltage comparison module comprises:

a voltage comparator, wherein an input end of the voltage comparator is electrically connected to the second input node;

a central controller, comprising a first sub-input end, a second sub-input end, and a first sub-output end, wherein the first sub-input end is electrically connected to the third input node, the second-sub input end is electrically connected to an output end of the voltage comparator, and the first sub-output end is electrically connected to the second output node.

In an embodiment, the voltage comparison module comprises a micro control unit;

the micro control unit comprises a digital-to-analog converter, the digital-to-analog converter comprises a third sub-input end, a fourth sub-input end, and a second sub-output end, the third sub-input end is electrically connected to the third input node, the fourth sub-input end is electrically connected to the second input node, and the second sub-output end is electrically connected to the second output node.

In an embodiment, the voltage processing module further comprises a voltage superposition module, the voltage superposition module comprises a fourth input node and a third output node, the fourth input node is electrically connected to the second output node to obtain the first target voltage signal, and the third output node is electrically connected to the first output node;

the voltage superposition module is configured to generate a second target voltage signal according to the first target voltage signal and a to-be-superimposed voltage signal, and the voltage of the at least one of the common electrode and the plurality of data lines in the $(n+k)^{th}$ frame is related to the second target voltage signal;

the to-be-superimposed voltage signal is related to at least one of the common voltage signal of the common electrode in the $n^{th}$ frame and data voltage signals of the plurality of data lines in the $n^{th}$ frame.

In an embodiment, the voltage superposition module further comprises a fifth input node, the fifth input node is configured to be loaded with the to-be-superimposed voltage signal, and the voltage superposition module comprises an adder or a subtracter; and the adder or the subtracter comprises a fifth sub-input end, a sixth sub-input end, and a third sub-output end, the fifth sub-input end is configured as the fourth input node, the sixth sub-input end is configured as the fifth input node, and the third sub-output end is configured as the third output node.

In an embodiment, the display device further comprises a data driving module, an input end of the data driving module is electrically connected to the first output node, and an output end of the data driving module is electrically connected to the plurality of data lines; and the data driving module is configured to control voltages of the plurality of data lines in the $(n+k)^{th}$ frame according to the first target voltage signal.

In an embodiment, the display device further comprises a common driving module, an input end of the common driving module is electrically connected to the first output node, and an output end of the common driving module is electrically connected to the common electrode; and the common driving module is configured to control the voltage of the common electrode in the $(n+k)^{th}$ frame according to the first target voltage signal.

In an embodiment, a display image of the display panel in the $n^{th}$ frame is at least partially same as a display image in the $(n+k)^{th}$ frame.

The present invention provides a control method of a display device for controlling the display device as described above-comprising steps of:

acquiring the common voltage signal of the common electrode in the $n^{th}$ frame; and controlling the voltage of the at least one of the common electrode and the plurality of data lines in the $(n+k)^{th}$ frame according to the difference between the common voltage signal of the $n^{th}$ frame and the standard voltage, both n and k are positive integers.

In an embodiment, before the step of controlling the voltage of the at least one of the common electrode and the plurality of data lines in the $(n+k)^{th}$ frame, the control method further comprises:

acquiring a frame synchronization signal;

wherein the step of controlling the voltage of the at least one of the common electrode and the plurality of data lines in the $(n+k)^{th}$ frame comprises:

controlling the voltage of the at least one of the common electrode and the plurality of data lines in the $(n+k)^{th}$ frame according to the difference between the common voltage signal in the $n^{th}$ frame and the standard voltage signal in response to a synchronization pulse appearing in the frame synchronization signal.

In an embodiment, the step of controlling the voltage of the at least one of the common electrode and the plurality of data lines in the $(n+k)^{th}$ frame according to the difference between the common voltage signal in the $n^{th}$ frame and the standard voltage in response to a synchronization pulse appearing in the frame synchronization signal comprises:

generating a first target voltage signal according to the difference between the common voltage signal in the $n^{th}$ frame and the standard voltage signal in response to the synchronization pulse in the frame synchronization signal; and generating a second target voltage signal according to the first target voltage signal and a to-be-superimposed voltage signal, and the voltage of the at least one of the common electrode and the plurality of data lines in the $(n+k)^{th}$ frame is related to the second target voltage signal.

The present invention provides a display device and a control method thereof. The display device comprises: a display panel, comprising a common electrode and a plurality of data lines; a voltage processing module, comprising a first input node and a first output node, wherein the first input node is electrically connected to the common electrode to obtain a common voltage signal of the common electrode in an $n^{th}$ frame, and the first output node is electrically connected to at least one of the common electrode and the plurality of data lines; wherein, the voltage processing module is configured to control a voltage of the at least one of the common electrode and the plurality of data lines in an $(n+k)^{th}$ frame through the first output node according to a difference between the common voltage signal of the $n^{th}$ frame and a standard voltage, and both n and k are positive integers. Wherein, based on same displayed images of the $n^{th}$ frame and the $(n+k)^{th}$ frame, the present invention takes the difference between the common voltage signal of the $n^{th}$ frame and the standard voltage as a basis for adjusting the voltage of the at least one of the common electrode and the plurality of data lines in the $(n+k)^{th}$ frame, rather than compensating the $n^{th}$ frame, which can have sufficient time to compensate an image of the $(n+k)^{th}$ frame and alleviate a problem of compensation delay.

BRIEF DESCRIPTION OF DRAWINGS

The present invention will be further described below through accompanying drawings. It should be noted that, the drawings in the following description are only for explaining some embodiments of the present invention. For those skilled in the art, other drawings can be obtained based on these drawings without creative work.

DETAILED DESCRIPTION OF PREFERRED EMBODIMENTS

In the following, the technical scheme in the embodiment of the present invention will be described clearly and completely in combination with the drawings. Obviously, the described embodiments are only a part of the embodiments of the present invention, rather than all the embodiments. Based on the embodiments of the present invention, all other embodiments obtained by those skilled in the art without creative work fall within the protection scope of the present invention.

In the description of the present invention, the terms "first" and "second" are only used for descriptive purposes and cannot be understood as indicating or implying relative importance or implicitly indicating the number of indicated technical features. Thus, the features defining "first" and "second" may explicitly or implicitly comprise one or more of the features. In the description of the present invention, "multiple" means two or more. Unless otherwise expressly and specifically limited, "electrical connection" means that the two are conductive, which does not limit direct connection or indirect connection. In addition, it should also be noted that the attached drawings only provide structures closely related to the present invention, and omit some details that are not related to the present invention. A purpose is to simplify the attached drawings and make the point of invention clear at a glance, rather than indicating that the device in practice is the same as that in the attached drawings, which is not a limitation of the device in practice.

The present invention provides a display device, the display device comprises, but is not limited to, following embodiments and combinations between the following embodiments.

Figure 1:
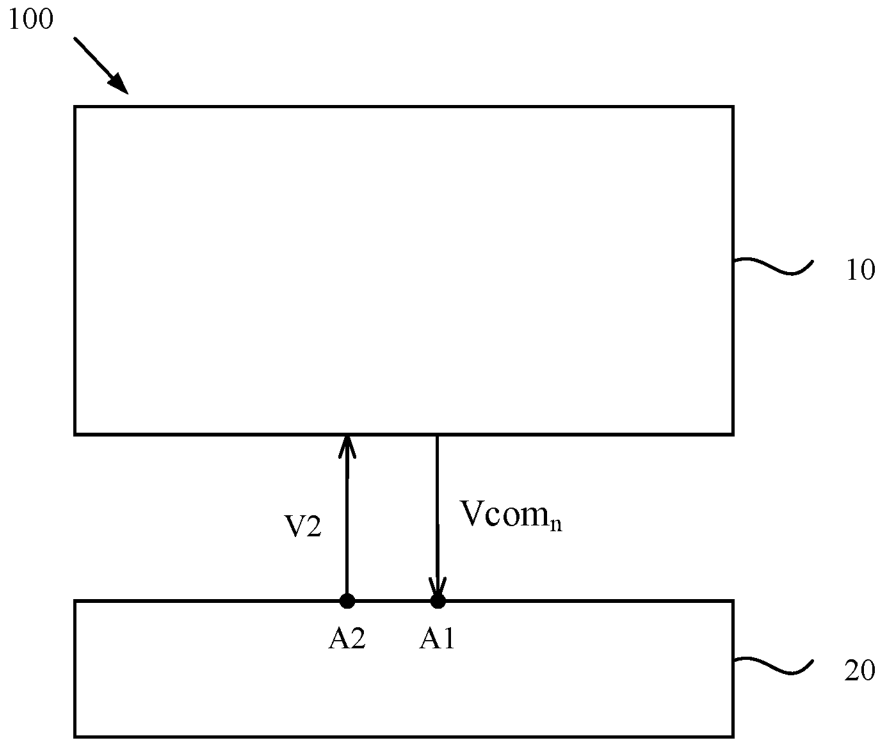
FIG. 1 is a schematic structural diagram of a display device provided by embodiments of the present invention.

In an embodiment, as shown in FIG. 1, the display device 100 comprises: a display panel 10, comprising a common electrode and a plurality of data lines; a voltage processing module 20, comprising a first input node A1 and a first output node A2; wherein the first input node A1 is electrically connected to the common electrode to obtain a common voltage signal $Vcom_n$ of the common electrode in an $n^{th}$ frame, and the first output node A2 is electrically connected to at least one of the common electrode and the plurality of data lines; the voltage processing module 20 is configured to control a voltage of the at least one of the common electrode and the plurality of data lines in an $(n+k)^{th}$ frame through the first output node A2 according to a difference between the common voltage signal $Vcom_n$ of the $n^{th}$ frame and a standard voltage $Vcom_s$. Both n and k are positive integers.

Specifically, the display panel 10 can comprise an array substrate and a color film substrate arranged opposite to each other. The array substrate can comprise a circuit layer, the circuit layer can comprise, but is not limited to, a plurality of transistors, a plurality of gate lines, and a plurality of data lines. A plurality of sub-pixel electrodes electrically connected to the plurality of transistors can be arranged on a side of the circuit layer close to the color film substrate, and a common electrode can be arranged on a side of the color film substrate close to the array substrate. Further, a liquid crystal layer can be arranged between the plurality of sub-pixel electrodes and the common electrode, and liquid crystal molecules in the liquid crystal layer can deflect under an action of a longitudinal electric field generated by voltage differences between corresponding ones of the sub-pixel electrodes and the common electrode, so as to allow light generated by a corresponding backlight panel to pass through, so that the display panel 10 presents corresponding brightness. Of course, the common electrode can also be arranged on a same side as the plurality of sub-pixel electrodes. Similarly, the liquid crystal molecules in the liquid crystal layer can deflect under an action of a transverse electric field generated by the voltage differences between the corresponding ones of the sub-pixel electrodes and the common electrode, so as to realize presentation of a corresponding brightness.

Wherein combined with the above discussion, for each sub-pixel, corresponding ones of the liquid crystal molecules can deflect under an action of an electric field generated by a voltage difference between the corresponding ones of the sub-pixel electrodes and the common electrode, so as to control the sub-pixel to appear as the corresponding brightness. It should be noted that for an image of "white box with gray background", when a gray scale between two adjacent rows required to be displayed in some areas has a larger difference, and when a later row of the sub-pixels of the two adjacent rows is turned on, due to a sudden change of a voltage loaded on the data lines, coupled with coupling capacitance generated by the data lines and the common electrode, a voltage of the common electrode will suddenly change and will be gradually restored after a period of time, so in other areas, when the gray scale between the two adjacent rows required to be displayed has a small difference and the gray scale displayed by the later row of the sub-pixels of the two adjacent rows is higher or lower due to the sudden change of the voltage of the common electrode, a moderately black line or a moderately white line in a horizontal direction appears in these areas, that is, it appears to be a horizontal crosstalk phenomenon.

It can be understood that this embodiment provides the voltage processing module 20 that obtains the common voltage signal $Vcom_n$ of the common electrode in the $n^{th}$ frame, and takes the difference between the common voltage signal $Vcom_n$ and the standard voltage $Vcom_s$ as the basis for adjusting the voltage of the at least one of the common electrode and the plurality of data lines in the $(n+k)^{th}$ frame; that is, according to the difference between the common voltage signal $Vcom_n$ and the standard voltage $Vcom_s$, the voltage of the at least one of the common electrode and the plurality of data lines in the $(n+k)^{th}$ frame is further determined, and the voltage of the at least one of the common electrode and the plurality of data lines in the $(n+k)^{th}$ frame is controlled to compensate for the sudden change of the voltage of the common electrode originally in a partial area of the $(n+k)^{th}$ frame, so as to reduce or even eliminate a voltage change between the common electrode and the corresponding pixel electrode caused by the sudden change of the common electrode voltage, so as to weaken or eliminate the horizontal crosstalk phenomenon. Moreover, in this embodiment, an object of compensation is the $(n+k)^{th}$ frame after the $n^{th}$ frame, rather than the $n^{th}$ frame. There can be a sufficient time to compensate an image of the $(n+k)^{th}$ frame, which alleviates a problem of compensation delay.

Wherein a displayed image of the display panel in the $n^{th}$ frame and a displayed image in the $(n+k)^{th}$ frame are at least partially the same, that is, theoretically, the displayed image of the display panel 10 in the $n^{th}$ frame and the displayed image in the $(n+k)^{th}$ frame can be all the same or partially the same. For example, when the displayed image of the display panel 10 in the $n^{th}$ frame and the displayed image in the $(n+k)^{th}$ frame are all the same, the voltage processing module 20 can record a plurality of moments when the common voltage signal $Vcom_n$ is different from the standard voltage $Vcom_s$ in the $n^{th}$ frame and a plurality of differences corresponding to the plurality of moments, so that in the $(n+k)^{th}$ frame, voltage compensation between the corresponding common electrode and the corresponding sub-pixel is performed at the plurality of moments when the common voltage signal $Vcom_n$ is different from the standard voltage $Vcom_s$. For another example, when the displayed image of the display panel 10 in the $n^{th}$ frame is partially the same as the displayed image in the $(n+k)^{th}$ frame, the voltage processing module 20 can record at least the plurality of differences between the common voltage signal $Vcom_n$ and the standard voltage $Vcom_s$ in the $n^{th}$ frame and the $(n+k)^{th}$ frame, so that in the $(n+k)^{th}$ frame, the voltage compensation between the corresponding common electrode and the corresponding sub-pixel is performed at the plurality of moments when the common voltage signal $Vcom_n$ is different from the standard voltage $Vcom_s$.

Specifically, as shown in FIG. 1, the voltage processing module 20 is configured to control the at least one of the common electrode and the plurality of data lines to have a voltage in the $(n+k)^{th}$ frame after a preset duration from a beginning of the $n^{th}$ frame, and the preset duration is shorter than a duration from the beginning of the $n^{th}$ frame to an end of an $(n+k-1)^{th}$ frame. It can be understood that in combination with the above discussion, based on the fact that the displayed image of the display panel 10 in the $n^{th}$ frame and the displayed image in the $(n+k)^{th}$ frame are all the same, this embodiment can record the plurality of moments when the common voltage signal $Vcom_n$ is different from the standard voltage $Vcom_s$ in the $n^{th}$ frame and the corresponding plurality of differences to form a voltage difference signal in the $n^{th}$ frame; and after the preset duration (that is, before arriving at the $(n+k)^{th}$ frame), according to the voltage difference signal of the $n^{th}$ frame, the at least one of the common electrode and the plurality of data lines to is controlled to have the voltage in the $(n+k)^{th}$ frame, that is, corresponding compensation can be made for each moment of the $(n+k)^{th}$ frame in advance, which further alleviates the problem of compensation delay caused by reasons comprising but not limited to signal transmission delay.

Figure 2:
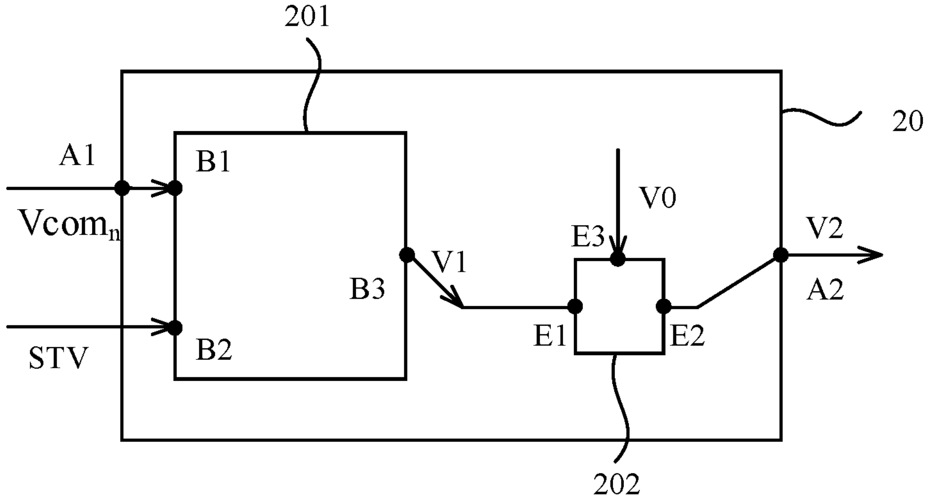
FIG. 2 is a schematic structural diagram of a voltage processing module provided by the embodiments of the present invention.

In an embodiment, as shown in FIG. 1 and FIG. 2, the voltage processing module 20 comprises a voltage comparison module 201. The voltage comparison module 201 comprises a second input node B1, a third input node B2, and a second output node B3; the second input node B1 is electrically connected to the first input node A1; the second output node B3 is electrically connected to the first output node A2; and the third input node B2 is configured to be loaded with a frame synchronization signal STV. When a synchronization pulse appears in the frame synchronization signal, the voltage comparison module 201 is configured to generate a first target voltage signal V1 according to the difference between the common voltage signal $Vcom_n$ and the standard voltage $Vcom_s$ in the $n^{th}$ frame. The voltage of the at least one of the common electrode and the plurality of data lines in the $(n+k)^{th}$ frame is related to the first target voltage signal V1.

Wherein the frame synchronization signal STV can comprise a plurality of synchronization pulses arranged at intervals, and an arrival of each synchronization pulse can indicate a starting of a corresponding frame. It can be understood that in this embodiment, the voltage comparison module 201 generates the first target voltage signal V1 according to the difference between the common voltage signal $Vcom_n$ of the $n^{th}$ frame and the standard voltage $Vcom_s$ when the synchronization pulse appears in the frame synchronization signal STV, that is, when each frame (i.e., comprising the $n^{th}$ frame) begins, the voltage comparison module 201 will successively obtain a plurality of current continuous voltage values of the common electrode according to a sampling frequency to form a common voltage waveform of a current frame (comprising a waveform corresponding to the common voltage signal $Vcom_n$ of the $n^{th}$ frame), which can improve reliability and efficiency of the voltage processing module 20 obtaining the common voltage signal $Vcom_n$ of the $n^{th}$ frame, and prevent offset or incompleteness of the "common voltage waveform of the current frame" formed.

Figure 3:
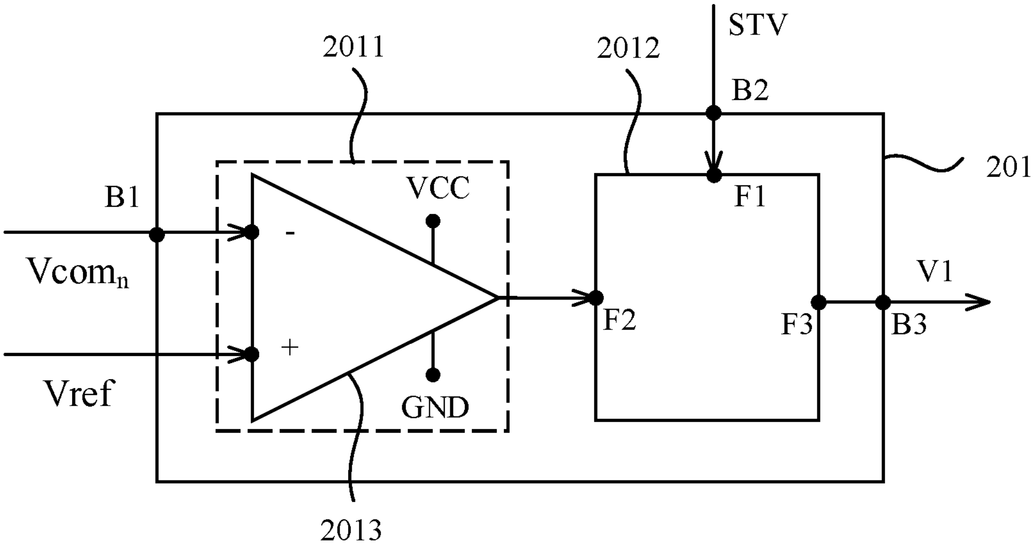
FIG. 3 is a schematic structural diagram of a voltage comparison module provided by the embodiments of the present invention.

In an embodiment, as shown in FIG. 2 and FIG. 3, the voltage comparison module 201 comprises a voltage comparator 2011 and a central controller 2012. An input end of the voltage comparator 2011 is electrically connected to the second input node B1. The central controller 2012 comprises a first sub-input end F1, a second sub-input end F2, and a first sub-output end F3. The first sub-input end F1 is electrically connected to the third input node B2, the second sub-input end F2 is electrically connected to an output end of the voltage comparator 2011, and the first sub-output end F3 is electrically connected to the second output node B3.

In combination with the above discussion, the input end of the voltage comparator 2011 is loaded with the common voltage signal $Vcom_n$ of the $n^{th}$ frame. Specifically, the input end of the voltage comparator 2011 can comprise an in-phase input end and an inverting input end, the in-phase input end can be loaded with a reference voltage Vref, and the inverting input end can be loaded with the common voltage signal $Vcom_n$ of the $n^{th}$ frame. Of course, the in-phase input end and the inverting input end can also be switched. The voltage comparator 2011 can be formed by an open loop between an output end and an input end of a first operational amplifier 2013, thereby eliminating a pull-up resistance connected to the output end. The voltage comparator 2011 can be loaded with a working voltage VCC and a grounding voltage GND to maintain a working state. Further, the central controller 2012 can generate the first target voltage signal V1 according to a voltage of the output end of the voltage comparator 2011 (generated according to the common voltage signal $Vcom_n$ of the $n^{th}$ frame) when the synchronization pulse appears in the frame synchronization signal STV, and the central controller 2012 can have the sampling frequency mentioned above.

Figure 4:
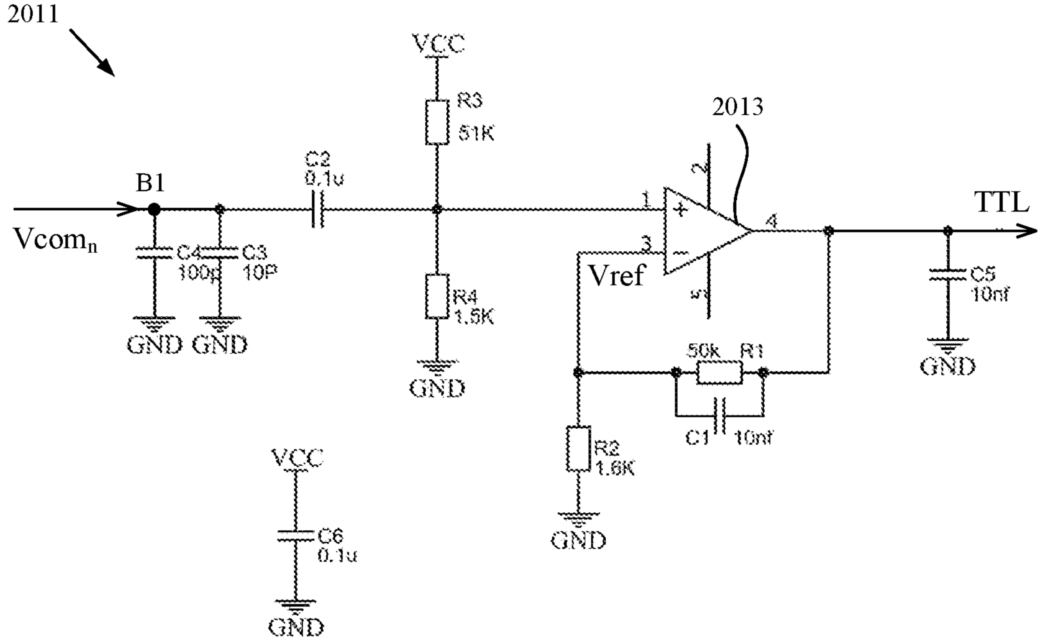
FIG. 4 is a schematic structural diagram of a voltage comparator provided by the embodiments of the present invention.

Specifically, as shown in FIG. 4, the voltage comparator 2011 can further comprise a plurality of capacitors and resistors. Wherein a first capacitor C1 and a first resistor R1 can be set in parallel and connected between the output end (pin 4) and the inverting input end (pin 3) of first operational amplifier 2013 to form a feedback loop. The first capacitor C1 can filter a noise in the feedback loop generated by comprising but not limited to the first operational amplifier 2013. A second resistor R2 can be connected between the grounding voltage GND and the inverting input end (pin 3) to be connected in series with the first resistor R1 between the output end (pin 4) and the grounding voltage GND and to provide the reference voltage Vref for the inverting input end (pin 3). Pin 2 of the voltage comparator 2011 can be loaded with the working voltage VCC, and pin 5 can be loaded with the grounding voltage GND to maintain operation of the voltage comparator 2011. A third resistor R3 and a fourth resistor R4 are set in series, and the third resistor R3 and the fourth resistor R4 are connected to the in-phase input end (pin 1) through a same node to divide the loaded working voltage VCC and the grounding voltage GND to provide a suitable voltage for the in-phase input end (pin 1). A third capacitor C3 and a fourth capacitor C4 are connected in parallel at a same node to form an "inverted U-shaped" low pass filter. The "inverted U-shaped" low pass filter and a high pass filter formed by the second capacitor C2 can form a band-pass filter to filter out the noise with higher or lower frequency in the common voltage signal $Vcom_n$ of the $n^{th}$ frame, so that the voltage loaded to the in-phase input end (pin 1) can be appropriately compared with the reference voltage Vref. A fifth capacitor C5 can further filter out a noise in the output end (pin 4) generated by comprising but not limited to the first operational amplifier 2013.

Wherein in this embodiment, capacitance values of the plurality of capacitors and resistance values of the plurality of resistors in FIG. 4 are not limited, and only functions described above need to be realized. The resistance values of the plurality of resistors and the capacitance values of the plurality of capacitors in FIG. 4 can be taken as a specific embodiment. In addition, a relative order of the "inverted U-shaped" low-pass filter and the second capacitor C2 is not limited. In particular, in combination with FIG. 4, the node loaded with the working voltage VCC mentioned above can be grounded through a sixth capacitor C6 to filter out a high-frequency signal, which improves voltage stability of the node loaded with the working voltage VCC (that is, it is stabilized as a direct current component).

It is understandable that through an action of the voltage comparator 2011, the common voltage signal $Vcom_n$ of the $n^{th}$ frame can be converted into a TTL signal comprising a plurality of pulses, which can characterize moments when the voltage of the common voltage signal $Vcom_n$ of the $n^{th}$ frame is too large. Further, combined with the above discussion, the central controller 2012 can generate the first target voltage signal V1 according to distribution of the plurality of pulses in the TTL signal when the synchronization pulse appears in the frame synchronization signal STV as a basis for the voltage of the at least one of the common electrode and the plurality of data lines in the $(n+k)^{th}$ frame. In particular, the central controller 2012 in this embodiment can also provide, but not limited to, the frame synchronization signal STV mentioned above and image data signals to a data driving module to control displayed images of the display panel 10.

Figure 5:
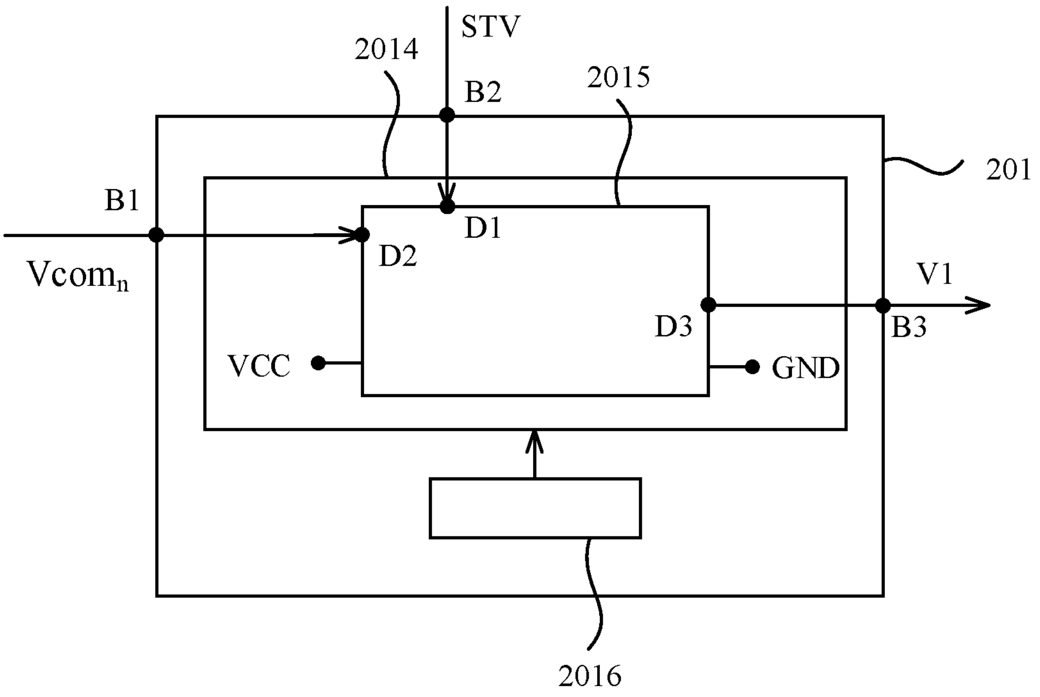
FIG. 5 is a schematic structural diagram of another voltage comparison module provided by the embodiments of the present invention.

In an embodiment, in combination with FIG. 2 and FIG. 5, the voltage comparison module 201 comprises a micro control unit 2014. The micro control unit 2014 comprises a digital-to-analog converter 2015. The digital-to-analog converter 2015 comprises a third sub-input end D1, a fourth sub-input end D2, and a second sub-output end D3. The third sub-input end D1 is electrically connected to the third input node B2, the fourth sub-input end D2 is electrically connected to the second input node B1, and the second sub-output end D3 is electrically connected to the second output node B3.

Specifically, compared with the embodiment shown in FIG. 3, the micro control unit 2014 in this embodiment comprises the digital-to-analog converter 2015, and the digital-to-analog converter 2015 stores a threshold voltage as a comparison object of the common voltage signal $Vcom_n$ of the $n^{th}$ frame, so the first operational amplifier 2013, which is also configured to compare the voltage, can be saved. Combined with the above discussion, the standard voltage $Vcom_s$, the reference voltage Vref, and the threshold voltage can be related or even the same. Of course, according to other parameters in the digital-to-analog converter 2015, the threshold voltage can also be different from the reference voltage Vref mentioned above. It should be noted that in combination with the above discussion, the voltage comparison module 201 can also comprise a crystal oscillator circuit 2016 externally connected to the micro control unit 2014 to provide an accurate working frequency (i.e., the sampling frequency mentioned above) for the micro control unit 2014. Wherein the micro control unit 2014 can also load the working voltage VCC and the grounding voltage GND to maintain the working state.

It can be understood that the micro control unit 2014 in this embodiment comprises a digital-to-analog converter 2015, which can generate the first target voltage signal V1 according to the common voltage signal $Vcom_n$ of the $n^{th}$ frame and the threshold voltage when the synchronization pulse appears in the frame synchronization signal STV as the basis for the voltage of the at least one of the common electrode and the plurality of data lines in the $(n+k)^{th}$ frame. In particular, in combination with the above discussion, the third sub-input end D1 and the third input node B2 here can be electrically connected to a central control chip to obtain the frame synchronization signal STV. The central control chip provides, but is not limited to, the data driving module with the frame synchronization signal STV and image data signals mentioned above to control the displayed images of the display panel 10.

In an embodiment, in combination with FIG. 1 and FIG. 2, the voltage processing module 20 further comprises a voltage superposition module 202. The voltage superposition module 202 comprises a fourth input node E1 and a third output node E2; the fourth input node E1 is electrically connected to the second output node B3 to obtain the first target voltage signal V1, and the third output node E2 is electrically connected to the first output node A2. The voltage superposition module 202 is configured to generate a second target voltage signal V2 according to the first target voltage signal V1 and a to-be-superimposed voltage signal V0. The voltage of the at least one of the common electrode and the plurality of data lines in the $(n+k)^{th}$ frame is related to the second target voltage signal V2. Wherein the to-be-superimposed voltage signal V0 is related to the at least one of the common voltage signal of the common electrode in the $n^{th}$ frame and the data voltage signals of the plurality of data lines in the $n^{th}$ frame.

It can be understood that, in this embodiment, the to-be-superimposed voltage signal V0 is related the at least one of the common voltage signal of the common electrode in the $n^{th}$ frame and the data voltage signals of the plurality of data lines in the $n^{th}$ frame, and the first target voltage signal V1 determined according to the common voltage signal $Vcom_n$ of the $n^{th}$ frame and the to-be-superimposed voltage signal V0 are calculated to generate the second target voltage signal V2 for controlling the voltage of at least one of the common electrode and the plurality of data lines in $(n+k)^{th}$ frame; that is, the second target voltage signal V2 can correspond to the to-be-superimposed voltage signal V0; for example, when the to-be-superimposed voltage signal V0 is related to or even the same as the common voltage signal $Vcom_n$ of the common electrode of the $n^{th}$ frame, the second target voltage signal V2 can control the common voltage signal $Vcom_n$ of the common electrode of the $n^{th}$ frame or the voltage differences between the common electrode and the data lines the $n^{th}$ frame. When the to-be-superimposed voltage signal V0 is related to or even the same as the data voltage signals of the plurality of data lines in the $n^{th}$ frame, the second target voltage signal V2 can control the data voltage signals of the plurality of data lines in the $n^{th}$ frame or the voltage differences between the common electrode and the data lines in the $n^{th}$ frame. Moreover, this embodiment compensates the $(n+k)^{th}$ frame after the $n^{th}$ frame, rather than compensating the $n^{th}$ frame. There can be a sufficient time to compensate the image of the $(n+k)^{th}$ frame, which alleviates the problem of compensation delay. The to-be-superimposed voltage signal V0 can be stored in the voltage superposition module 202 or obtained by the voltage superposition module 202.

Figure 6:
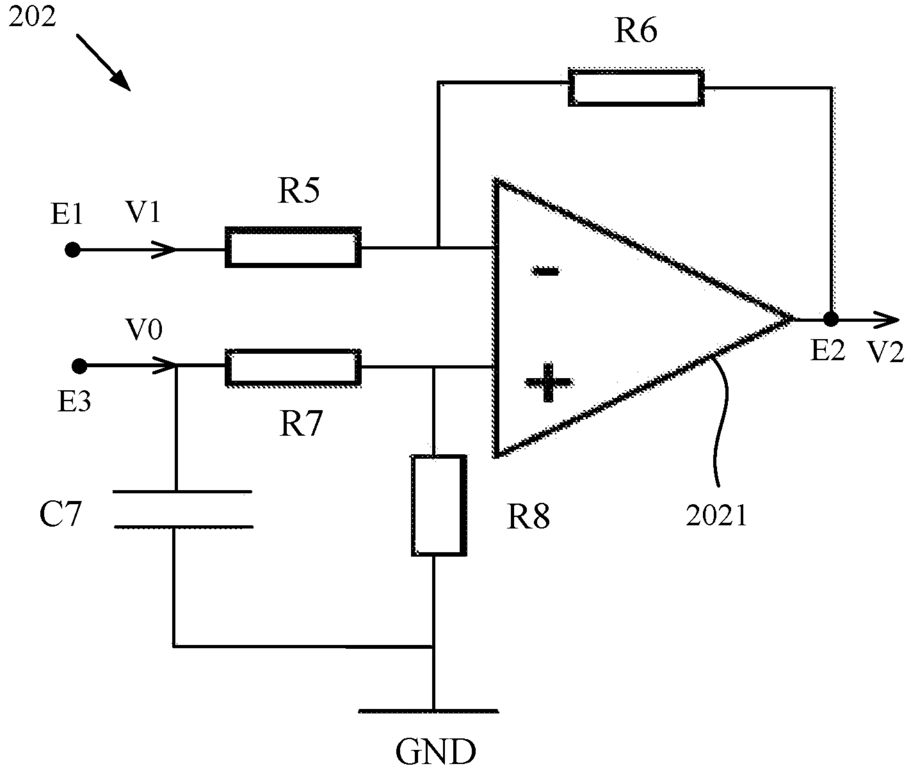
FIG. 6 is a schematic structural diagram of a voltage superposition module provided by the embodiments of the present invention.

In an embodiment, in combination with FIG. 1, FIG. 2, and FIG. 6, the voltage superposition module 202 further comprises a fifth input node E3, the fifth input node E3 is configured to be loaded with the to-be-superimposed voltage signal V0. The voltage superposition module 202 comprises an adder or a subtractor; and the adder or the subtractor comprises a fifth sub-input end, a sixth sub-input end, and a third sub-output end. The fifth sub-input end is configured as the fourth input node E1, the sixth sub-input end is configured as the fifth input node E3, and the third sub-output end is configured as the third output node E2.

Specifically, in combination with FIG. 2 and FIG. 6, the voltage superposition module 202 comprises a subtracter as an example. The voltage superposition module 202 can be a differential circuit, the differential circuit comprises, but is not limited to, a second operational amplifier 2021, a plurality of resistors, and at least one capacitor. Wherein a fifth resistor R5 can be connected between an inverting input end and the fifth sub-input end (i.e., the fourth input node E1) of the second operational amplifier 2021, a sixth resistor R6 can be connected between the inverting input end and the third sub-input end (i.e., the third output node E2) of the second operational amplifier 2021, and a seventh resistor R7 can be connected between the in-phase input end and the sixth sub-input end (i.e., the fifth input node E3) of the second operational amplifier 2021. An eighth resistor R8 can be connected between the in-phase input end of the second operational amplifier 2021 and the ground, and a seventh capacitor C7 can be connected between the sixth sub-input end (that is, the fifth input node E3) and the ground to filter out noise in the to-be-superimposed voltage signal V0.

It can be understood that in this embodiment, according to the to-be-superimposed voltage signal V0 and a type, the subtracter or the adder can be selected to form the voltage superposition module 202, and the to-be-superimposed voltage signal V0 and the first target voltage signal V1 can be calculated to obtain the second target voltage signal V1, so as to control the voltage of the at least one of the common electrode and the plurality of data lines in the $(n+k)^{th}$ frame. Wherein this embodiment does not limit resistance values of the plurality of resistors and capacitance values of the plurality of capacitors in the voltage superposition module 202, but only the corresponding functions needs to be realized.

Figure 7:
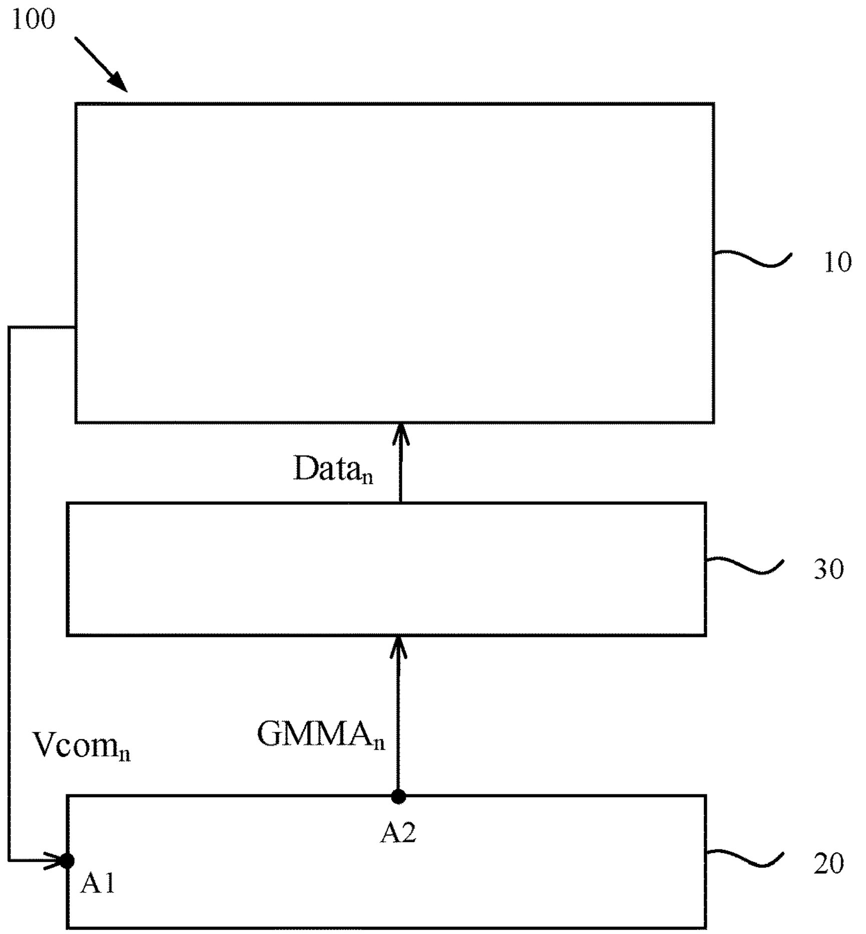
FIG. 7 is a schematic structural diagram of another display device provided by the embodiments of the present invention.

In an embodiment, in combination with FIG. 1 and FIG. 7, the display device further comprises a data driving module 30. An input end of the data driving module 30 is electrically connected to the first output node A2, and an output end of the data driving module 30 is electrically connected to the plurality of data lines. The data driving module 30 controls voltages of the plurality of data lines in the $(n+k)^{th}$ frame according to the first target voltage signal V1.

It should be noted that in combination with the above discussion, the to-be-superimposed voltage signal V0 is related to the at least one of the common voltage signal of the common electrode in the $n^{th}$ frame and the data voltage signals of the plurality of data lines in the $n^{th}$ frame, and the second target voltage signal V2 can correspond to the to-be-superimposed voltage signal V0. Specifically, based on "the data driving module 30 controls the voltages of the plurality of data lines in the $(n+k)^{th}$ frame according to the first target voltage signal V1", it can be considered that the to-be-superimposed voltage signal V0 can be related to the data voltage signals of the plurality of data lines in the $n^{th}$ frame, and the second target voltage signal V2 can control the data voltage signals of the plurality of data lines in the $(n+k)^{th}$ frame.

Wherein the data driving module 30 can determine a data voltage Data. loaded by each of the data lines in the $n^{th}$ frame based on a gamma voltage group $GMMA_n$ corresponding to data voltages in the $n^{th}$ frame. Further, the to-be-superimposed voltage signal V0 can be related to the gamma voltage group $GMMA_n$ corresponding to the data voltages of the plurality of data lines in the $n^{th}$ frame. Correspondingly, the second target voltage signal V2 can be related to a gamma voltage group $GMMA_{(n+k)}$ corresponding to data voltage signals of the plurality of data lines in the $(n+k)_{th}$ frame. For example, the to-be-superimposed voltage signal V0 can be a gamma voltage in the gamma voltage group $GMMA_n$, and the second target voltage signal V2 can be a corresponding gamma voltage in the gamma voltage group $GMMA_{(n+k)}$. Further, the data driving module 30 can determine a data voltage $Data_{(n+k)}$ loaded by each of the data lines in the $(n+k)^{th}$ frame based on the gamma voltage group $GMMA_{(n+k)}$ determined by the to-be-superimposed voltage signal V0 and the second target voltage signal V2, that is, it can be considered that the data voltage $Data_{(n+k)}$ has taken into account an impact caused by a voltage mutation of the common electrode in the $(n+k)_{th}$ frame and made timely compensation for it.

It should be noted that in combination with the above statement that "according to the to-be-superimposed voltage signal V0 and the type, the subtracter or the adder can be selected to form the voltage superposition module 202", in this embodiment, the subtractor or the adder can be selected to form the voltage superposition module 202 according to which gamma voltage in the gamma voltage group $GMMA_n$ the to-be-superimposed voltage signal V0 is. For example, the gamma voltage group $GMMA_n$ can comprise four gamma voltages: $GM1_n$, $GM7_n$, $GM8_n$, and $GM14_n$. When the to-be-superimposed voltage signal V0 is related to or equal to GM1 n or $GM7_n$, the adder can be selected to form the voltage superposition module 202. On the contrary, when the to-be-superimposed voltage signal V0 is related to or equal to $GM8_n$ or $GM14_n$, the subtractor can be selected to form the voltage superposition module 202.

Figure 8:
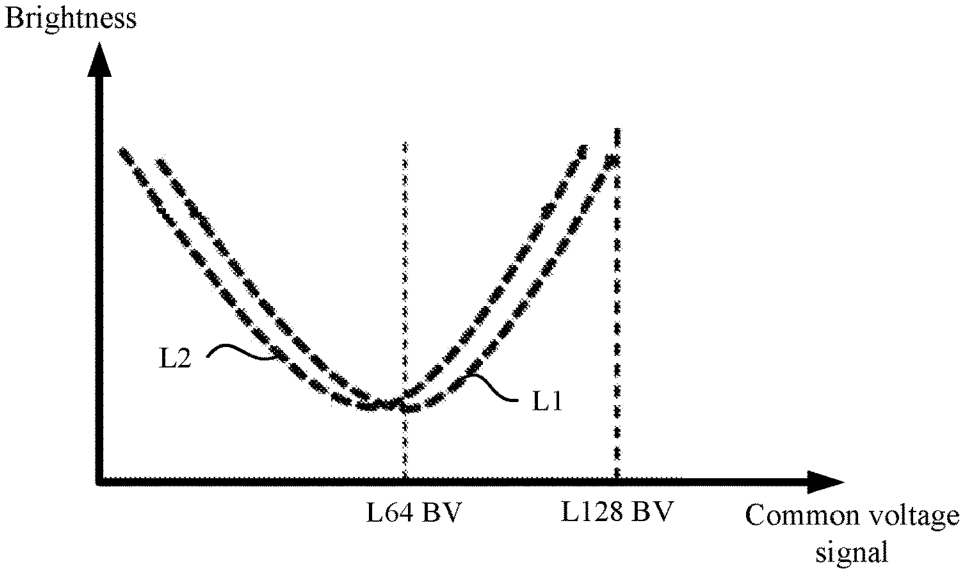
FIG. 8 is a graph of "brightness-common voltage signal" provided by the embodiments of the present invention.

In particular, based on the embodiment that the to-be-superimposed voltage signal V0 can be related to the gamma voltage group $GMMA_n$ corresponding to the data voltages of the plurality of data lines in the $n^{th}$ frame, it can be realized that the data voltage $Data_{(n+k)}$ has taken into account the impact caused by the voltage mutation of the common electrode in the $(n+k)^{th}$ frame and has compensated in time. Specifically, for example, as shown in FIG. 8, L1 is a graph of "brightness-common voltage signal" when a gray scale is 64, that is, the graph used to characterize the brightness of the displayed image and the voltage value of the common voltage signal on the premise that the voltage on the data line is a corresponding voltage when the gray scale is 64. When the common voltage signal on L1 changes near "L64 BV", a brightness difference is small. However, considering a problem of improving a residual image of the displayed image, the common voltage signal is generally set to be "L128 BV" which is much greater than "L64 BV". Therefore, in combination with the above discussion, when the data voltage on the data lines decreases from the corresponding gray scale of 64 to other values, due to the effect of the coupling capacitance, the common voltage signal will decrease from "L128 BV" to a corresponding voltage (i.e., decrease from A to B). Accordingly, the brightness will also decrease Δ Lv1, and an absolute value of ΔLv1 is much greater than a change value of the brightness when the common voltage signal changes near "L64 BV". Based on this, this embodiment adjusts a setting reference of the data voltage in the $(n+k)^{th}$ frame by setting as above, so that when the voltage value of the common voltage signal in the (n+k)th frame decreases by a corresponding voltage from "L128 BV" (that is, decrease from A to B) due to capacitive coupling, the data voltage on the data line also decreases correspondingly to form L2, L2 can be considered to be formed by L1 moving leftwards. Meanwhile, the change value of the corresponding brightness ΔLv2 is reduced relative to ΔLv1, which can alleviate the problem of horizontal crosstalk.

It should be noted that there is no limit on initial values, termination values, and change values of the data voltages that generates the horizontal crosstalk, and there is no limit on how the graph of "brightness-common voltage signal" moves. Specifically, the graph of "brightness-common voltage signal" can be determined based on the initial values, the termination values, the change values of the data voltages, and the initial value of the common data voltage that generates the horizontal crosstalk. That is, the graph of "brightness-common voltage signal" can be related to the second target voltage signal V2.

In an embodiment, as shown in FIG. 1, the display device 100 further comprises a common driving module. An input end of the common driving module is electrically connected to the first output node A2, and an output end of the common driving module is electrically connected to the common electrode. The common driving module controls the voltage of the common electrode in the $(n+k)^{th}$ frame according to the first target voltage signal V1.

Similarly, here, based on "the common driving module controls the voltage of the common electrode in the $(n+k)^{th}$ frame according to the first target voltage signal V1", it can be considered that the to-be-superimposed voltage signal V0 can be related to the common voltage signal of the common electrode in the $n^{th}$ frame, and the second target voltage signal V2 can control the common voltage signal of the common electrode in the $(n+k)^{th}$ frame.

Further, the to-be-superimposed voltage signal V0 can be the common voltage signal $Vcom_n$ of the common electrode in the $n^{th}$ frame, and correspondingly, the second target voltage signal V2 can be the common voltage signal $VCOM_{(n+k)}$ of the common electrode in the $(n+k)^{th}$ frame. Further, the common driving module can load the common voltage signal $VCOM_{(n+k)}$ determined based on the to-be-superimposed voltage signal V0 and the second target voltage signal V2 to the common electrode in the $(n+k)^{th}$ frame; that is, it can be considered that the common voltage signal $VCOM_{(n+k)}$ has considered an impact caused by the voltage mutation of the common electrode in the $(n+k)^{th}$ frame and made compensation in time for the impact. Further, the present invention can further realize functions of anti-chattering, filtering, and the like through hardware or software.

The present invention further provides a control method of a display device for controlling the display device as described above. The control method of the display device comprises, but is not limited to, following embodiments and combinations between the following embodiments.

Figure 9:
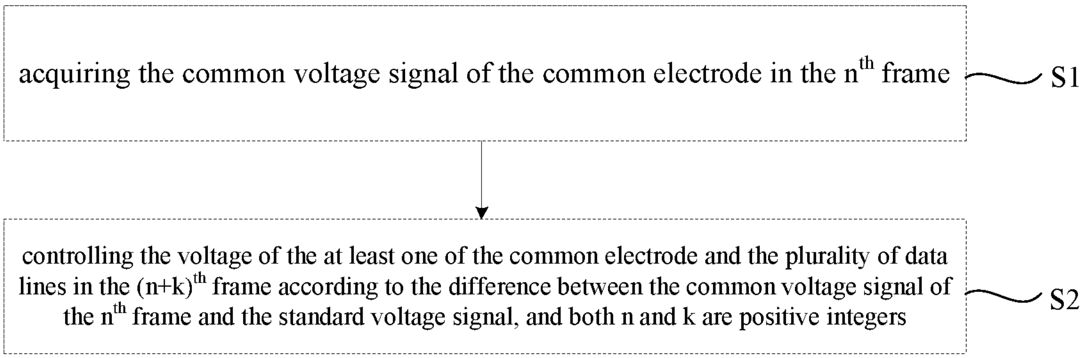
FIG. 9 is a flowchart of a control method of the display device provided by the embodiments of the present invention.

In an embodiment, as shown in FIG. 9, the control method of the display device can comprise, but is not limited to, following steps and a combination of the following steps.

S1, acquiring the common voltage signal of the common electrode in the $n^{th}$ frame.

Wherein the display panel 10 can comprise an array substrate and a color film substrate arranged opposite to each other. The array substrate can comprise a circuit layer, the circuit layer can comprise, but is not limited to, a plurality of transistors, a plurality of gate lines, and a plurality of data lines. A plurality of sub-pixel electrodes electrically connected to the plurality of transistors can be arranged on a side of the circuit layer close to the color film substrate, and a common electrode can be arranged on a side of the color film substrate close to the array substrate. For details, please refer to the relevant description above.

Similarly, for an image of "white box with gray background", when a gray scale between two adjacent rows required to be displayed in some areas has a larger difference, due to a sudden change of a voltage loaded on the data lines and an effect of coupling capacitance generated by the data lines and the common electrode, a moderately black line or a moderately white line finally appears in a horizontal direction in the areas, that is, it appears to be a horizontal crosstalk phenomenon.

S2, controlling the voltage of the at least one of the common electrode and the plurality of data lines in the $(n+k)^{th}$ frame according to the difference between the common voltage signal of the $n^{th}$ frame and the standard voltage signal, wherein both n and k are positive integers.

It can be understood that this embodiment acquires the common voltage signal $Vcom_n$ of the common electrode in the $n^{th}$ frame, and takes the difference between the common voltage signal $Vcom_n$ and the standard voltage $Vcom_s$ as the basis for adjusting the voltage of the at least one of the common electrode and the plurality of data lines in the $(n+k)^{th}$ frame; that is, according to the difference between the common voltage signal $Vcom_n$ and the standard voltage $Vcom_s$, the voltage of the at least one of the common electrode and the plurality of data lines in the $(n+k)^{th}$ frame is further determined, and the voltage of the at least one of the common electrode and the plurality of data lines in the $(n+k)^{th}$ frame is controlled to compensate for the sudden change of the voltage of the common electrode originally in a partial area of the $(n+k)^{th}$ frame, so that the voltage change between the common electrode and the corresponding sub-pixel caused by the sudden change of the voltage of the common electrode is small, or even unchanged, so as to weaken the horizontal crosstalk phenomenon. Moreover, in this embodiment, an object of compensation is the $(n+k)^{th}$ frame after the $n^{th}$ frame, rather than the $n^{th}$ frame. There can be a sufficient time to compensate an image of the $(n+k)^{th}$ frame, which alleviate a problem of compensation delay.

In an embodiment, before the step S2, it can further comprise, but is not limited to, following steps: S3, acquiring a frame synchronization signal. Based on this, the step S2 can comprise, but is not limited to, following steps: S201, controlling the voltage of the at least one of the common electrode and the plurality of data lines in the $(n+k)^{th}$ frame according to the difference between the common voltage signal in the $n^{th}$ frame and the standard voltage in response to a synchronization pulse appearing in the frame synchronization signal Wherein combined with the above discussion, the frame synchronization signal STV can comprise a plurality of synchronization pulses arranged at intervals, and an arrival of each synchronization pulse can indicate a starting of a corresponding frame. It can be understood that in this embodiment, the voltage comparison module 201 generates the first target voltage signal V1 according to the difference between the common voltage signal $Vcom_n$ of the $n^{th}$ frame and the standard voltage $Vcom_s$ when the synchronization pulse appears in the frame synchronization signal STV, that is, when each frame (i.e., comprising the $n^{th}$ frame) begins, [0060]the voltage comparison module 201 will successively obtain a plurality of current continuous voltage values of the common electrode according to a sampling frequency to form a common voltage waveform of a current frame (comprising a waveform corresponding to the common voltage signal Vcomn of the nth frame), which can improve reliability and efficiency of the voltage processing module 20 obtaining the common voltage signal Vcomn of the nth frame, and prevent offset or incompleteness of the "common voltage waveform of the current frame" formed.

Specifically, based on a fact that a displayed image of the display panel 10 in the $n^{th}$ frame and a displayed image in the $(n+k)^{th}$ frame are all the same, and in combination with the above discussion that "at least one of the common electrode and the plurality of data lines is controlled to have a voltage in the $(n+k)^{th}$ frame after a preset duration from a beginning of the $n^{th}$ frame, and the preset duration is shorter than a duration from the beginning of the $n^{th}$ frame to an end of the $(n+k-1)^{th}$ frame", this embodiment can record the plurality of moments when the common voltage signal $Vcom_n$ is different from the standard voltage $Vcom_s$ in the $n^{th}$ frame and the corresponding plurality of differences to form a voltage difference signal in the $n^{th}$ frame; and after the preset duration (that is, before arriving at the $(n+k)^{th}$ frame), according to the voltage difference signal of the $n^{th}$ frame, the at least one of the common electrode and the plurality of data lines is controlled to have the voltage in the $(n+k)^{th}$ frame, that is, the corresponding compensation can be made for each moment of the $(n+k)^{th}$ frame in advance, which further alleviate the problem of compensation delay caused by reasons comprising but not limited to signal transmission delay.

Figure 10:
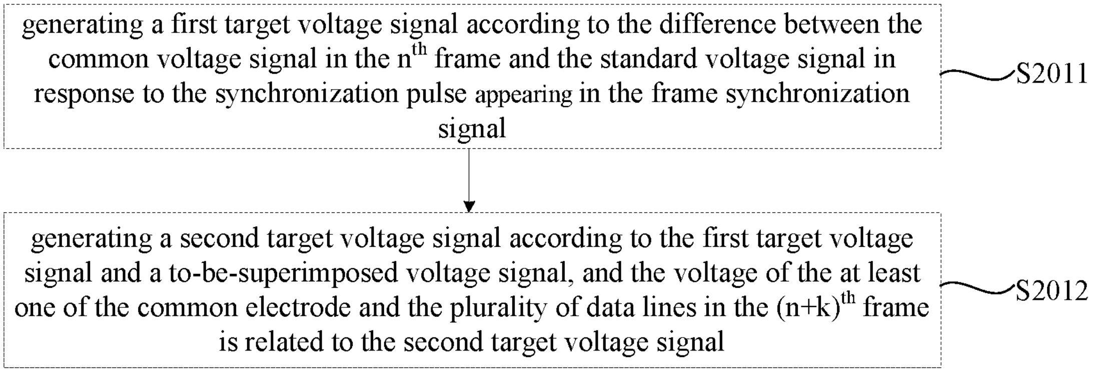
FIG. 10 is a flowchart of a control method of a yet another display device provided by the embodiments of the present invention.

In an embodiment, as shown in FIG. 10, the step S201 may include, but is not limited to, the following steps and combinations between the following steps.

S2011, generating a first target voltage signal according to the difference between the common voltage in the $n^{th}$ frame and the standard voltage in response to the synchronization pulse appearing in the frame synchronization signal.

For example, the first target voltage signal can be generated by the voltage comparator 2011 and the central controller 2012. The voltage comparator 2011 can be electrically connected to the common electrode and loaded with the reference voltage Vref in real time, and the differences between the common electrode and the reference voltage Vref at each moment can be generated in real time to form a TTL signal. Each pulse in the TTL signal can represent a difference between the common electrode and the reference voltage Vref at that moment. Further, the central controller 2012 can acquire the frame synchronization signal STV, sample the TTL signal according to the sampling frequency when identifying that the synchronization pulse appears in the frame synchronization signal STV, and generate a corresponding first sub-pulse when identifying a rising edge (the pulse in the TTL signal is positive) or a falling edge (the pulse in the TTL signal is negative) in the TTL signal. Therefore, the first target voltage signal V1 comprising a plurality of first sub-pulses can be generated according to distribution of the plurality of pulses in the TTL signal. If the synchronization pulse that will appear recently in the frame synchronization signal STV is considered to correspond to the image of the $n^{th}$ frame, the first target voltage signal V1 can be considered as the voltage difference signal of the $n^{th}$ frame mentioned above.

For another example, the first target voltage signal V1 can be generated by the micro control unit 2014 comprising the digital-to-analog converter 2015, the digital-to-analog converter 2015 is electrically connected to the common electrode in real time and stores the threshold voltage (which can be the same as the reference voltage Vref), and the frame synchronization signal STV can be obtained by but not limited to a central controller. Similarly, the first target voltage signal V1 as the voltage difference signal of the $n^{th}$ frame mentioned above can be generated.

Further, in the $n^{th}$ frame, for two areas with different horizontal crosstalk phenomena, such as shapes of two black lines are inconsistent, in combination with the above discussion, degrees of voltage mutation of the common electrode at corresponding two moments are different, and products of amplitudes and pulse widths of the corresponding two first sub-pulses in the generated first target signal V1 can be different. Further, at least one of the amplitudes and pulse widths of the corresponding two first sub-pulses can be different.

It should be noted that the "preset duration" mentioned above can be determined by experimenting with corresponding image improvement according to multiple set duration, so as to determine the corresponding preset duration when the $(n+k)^{th}$ frame displays a same image as the $n^{th}$ frame. The voltage comparison module 201 can store a preset duration corresponding to the $n^{th}$ frame and the $(n+k)^{th}$ frame, and an output time of the first target voltage signal V1 can be set according to the preset duration. Further, in combination with the above discussion, for the two areas with different horizontal crosstalk phenomena, the corresponding preset duration can be different, that is, different delay time can be set for the two first sub-pulses corresponding to the "two areas with different horizontal crosstalk phenomena" in image of the $n^{th}$ frame. In combination with the above discussion, the preset duration corresponding to the $n^{th}$ frame and the $(n+k)^{th}$ frame can be stored in the voltage comparison module 201, and the moment of the first sub-pulse appearing in the first target voltage signal V1 can be set according to the corresponding preset duration.

Specifically, in combination with the above discussion, the voltage comparison module 201 can comprise a first timer and a second timer. Wherein a timing duration of the first timer can be equal to an effective duration in each frame, that is, it can be equal to an occurrence time of the corresponding synchronization pulse to an occurrence time of a corresponding blank time period. The first timer can control a recording time of the voltage of the common electrode by the voltage comparison module 201 to be equal to the effective duration of the corresponding frame. Alternatively, a total sampling duration of the TTL signal by the voltage comparison module 201 can be controlled to be equal to the effective duration of the corresponding frame. Wherein a timing duration of the second timer can be equal to the "preset duration" mentioned above, and the second timer can control the output time of the first target voltage signal V1, and can even further control a time of the first sub-pulse of the first target voltage signal V1.

S2012, generating a second target voltage signal according to the first target voltage signal and a to-be-superimposed voltage signal, and the voltage of the at least one of the common electrode and the plurality of data lines in the $(n+k)^{th}$ frame is related to the second target voltage signal.

Wherein the to-be-superimposed voltage signal V0 in this embodiment is related to at least one of the common voltage signal of the common electrode in the $n^{th}$ frame and the data voltage signal of the plurality of data lines in the $n^{th}$ frame, and the first target voltage signal V1 determined according to the common voltage signal $Vcom_n$ of the $n^{th}$ frame and the to-be-superimposed voltage signal V0 are calculated to generate the second target voltage signal V2 for controlling the voltage of the at least one of the common electrode and the plurality of data lines in the $(n+k)^{th}$ frame; that is, the second target voltage signal V2 can correspond to the to-be-superimposed voltage signal V0. For details, please refer to the relevant description of the to-be-superimposed voltage signal and the second target voltage signal above.

The present invention provides a display device and a control method thereof. The display device comprises: a display panel, comprising a common electrode and a plurality of data lines; a voltage processing module, comprising a first input node and a first output node, wherein the first input node is electrically connected to the common electrode to obtain a common voltage signal of the common electrode in an $n^{th}$ frame, and the first output node is electrically connected to at least one of the common electrode and the plurality of data lines; wherein, the voltage processing module is configured to control a voltage of the at least one of the common electrode and the plurality of data lines in the $(n+k)^{th}$ frame through the first output node according to a difference between the common voltage signal of the $n^{th}$ frame and a standard voltage, and both n and k are positive integers. Wherein, based on same displayed images of the $n^{th}$ frame and the $(n+k)^{th}$ frame, the present invention takes the difference between the common voltage signal $Vcom_n$ of the $n^{th}$ frame and the standard voltage $Vcom_s$ as a basis for adjusting the voltage of the at least one of the common electrode and the plurality of data lines in the $(n+k)^{th}$ frame, rather than compensating the $n^{th}$ frame, which can provide a sufficient time to compensate an image of the $(n+k)^{th}$ frame and alleviate a problem of compensation delay.

The display device and the control method thereof provided in the present invention is described in detail above. And in this paper, specific examples are applied to explain the principle and implementation mode of the application. The above embodiments are only examples of the implementation of the present invention. It must be noted that the disclosed embodiments do not limit the scope of the present invention. On the contrary, the modification and equalization of the spirit and scope comprised in the claims are comprised in the scope of the invention.

What is claimed is:

1. A display device, comprising:

a display panel, comprising a common electrode and a plurality of data lines; and a voltage processing circuit, comprising a first input node electrically connected to the common electrode and a first output node electrically connected to at least one of the common electrode and the plurality of data lines, wherein the voltage processing circuit is configured to obtain a common voltage signal of the common electrode in an nth frame through the first output node, and configured to control a voltage of the at least one of the common electrode and the plurality of data lines in an (n+k)th frame through the first output node in response to a difference between the common voltage signal of the nth frame and a standard voltage, where the n and k are positive integers;

wherein the voltage processing circuit comprises a voltage comparison circuit, which comprises a second input node electrically connected to the first input node, a second output node electrically connected to the first output node, and a third input node loaded with a frame synchronization signal, and the voltage comparison circuit is configured to generate a first target voltage signal in response to the difference between the common voltage signal in the nth frame and the standard voltage on a condition of a synchronization pulse occurring in the frame synchronization signal; and wherein the voltage of the at least one of the common electrode and the plurality of data lines in the (n+k)th frame is related to the first target voltage signal.

2. The display device as claimed in claim 1, wherein the voltage comparison circuit comprises:

a voltage comparator, comprising an input end electrically connected to the second input node and an output end;

a central controller, comprising a first sub-input end electrically connected to the third input node, a second sub-input end electrically connected to the output end of the first circuit, and a first sub-output end electrically connected to the second output node.

3. The display device as claimed in claim 1, wherein the voltage comparison circuit comprises a digital-to-analog converter, and the digital-to-analog converter comprises a third sub-input end electrically connected to the third input node, a fourth sub-input end electrically connected to the second input node, and a second sub-output end electrically connected to the second output node.

4. The display device as claimed in claim 1, wherein the voltage processing circuit further comprises a voltage superposition circuit;

the voltage superposition circuit comprises a fourth input node electrically connected to the second output node and a third output node electrically connected to the first output node;

the voltage superposition circuit is configured to obtain the first target voltage signal through the fourth input node, and generate a second target voltage signal in response to the first target voltage signal and in response to a to-be-superimposed voltage signal, and the voltage of the at least one of the common electrode and the plurality of data lines in the (n+k)th frame is related to the second target voltage signal; and the to-be-superimposed voltage signal is related to at least one of the common voltage signal of the common electrode in the nth frame and data voltage signals of the plurality of data lines in the nth frame.

5. The display device as claimed in claim 4, wherein the to-be-superimposed voltage signal is same as the common voltage signal of the common electrode in the nth frame.

6. The display device as claimed in claim 4, wherein the to-be-superimposed voltage signal is related to a gamma voltage group corresponding to data voltages of the plurality of data lines in the nth frame.

7. The display device as claimed in claim 4, wherein the voltage superposition circuit further comprises a fifth input node loaded with the to-be-superimposed voltage signal; and the voltage superposition circuit comprises an adder or a subtracter, and the adder or the subtracter comprises a fifth sub-input end configured as the fourth input node, a sixth sub-input end configured as the fifth input node, and a third sub-output end configured as the third output node.

8. The display device as claimed in claim 1, wherein the display device further comprises a data driving circuit, which comprises an input end is electrically connected to the first output node and an output end electrically connected to the plurality of data lines, and the data driving circuit is configured to control voltages of the plurality of data lines in the (n+k)th frame in response to the first target voltage signal.

9. The display device as claimed in claim 1, wherein the display device further comprises a common driving circuit, which comprises an input end electrically connected to the first output node and an output end electrically connected to the common electrode, and the common driving circuit is configured to control the voltage of the common electrode in the (n+k)th frame in response to the first target voltage signal.

10. The display device as claimed in claim 1, wherein the frame synchronization signal comprises a plurality of synchronization pulses, and each of the synchronization pulses indicates a starting of a corresponding frame.

11. The display device as claimed in claim 1, wherein a displayed image of the display panel in the nth frame is at least partially same as a displayed image in the (n+k)th frame.

12. A control method of a display device, comprising steps of:

acquiring, by a voltage processing circuit, a common voltage signal of a common electrode in an nth frame;

acquiring, by a voltage comparison circuit of the voltage processing circuit, a frame synchronization signal; and controlling a voltage of at least one of the common electrode and a plurality of data lines in an (n+k)th frame in response to a difference between the common voltage signal of the nth frame and a standard voltage signal on a condition of a synchronization pulse occurring in the frame synchronization signal, where the both n and k are positive integers.

13. The control method of the display device as claimed in claim 12, wherein the step of controlling the voltage of the at least one of the common electrode and the plurality of data lines in the (n+k)th frame comprises:

generating, by voltage comparison circuit, a first target voltage signal in response to difference between the common voltage signal in the nth frame and the standard voltage signal on the condition of the synchronization pulse occurring in the frame synchronization signal; and generating, by a voltage superposition circuit of the voltage processing circuit, a second target voltage signal in response to the first target voltage signal and in response to a to-be-superimposed voltage signal, and the voltage of the at least one of the common electrode and the plurality of data lines in the (n+k)th frame is related to the second target voltage signal.

14. A display device, comprising:

a display panel, comprising a common electrode and a plurality of data lines; and a voltage processing circuit, comprising a first input node electrically connected to the common electrode and a first output node electrically connected to at least one of the common electrode and the plurality of data lines, and configured to obtain a common voltage signal of the common electrode in an nth frame through the first output node, wherein the voltage processing circuit comprises a voltage comparison circuit, which comprises a second input node electrically connected to the first input node, a second output node electrically connected to the first output node, and a third input node loaded with a frame synchronization signal; and wherein the voltage processing circuit is further configured to control a voltage of the at least one of the common electrode and the plurality of data lines in an (n+k)th frame through the first output node in response to a difference between the common voltage signal of the nth frame and a standard voltage on a condition of a synchronization pulse occurring in the frame synchronization signal, where n and k are positive integers.

* * * * *